United States Patent
Bruno

(10) Patent No.: US 12,556,114 B2
(45) Date of Patent: Feb. 17, 2026

(54) METHOD FOR CONTROLLING AN OPERATING DEVICE COMPRISING A MASTER ACTUATOR AND A SLAVE ACTUATOR AND ASSOCIATED HOME AUTOMATION SHADING SYSTEM

(71) Applicant: SOMFY ACTIVITES SA, Cluses (FR)

(72) Inventor: Serge Bruno, Marnaz (FR)

(73) Assignee: SOM FY ACTIVITES SA, Cluses (FR)

( * ) Notice: Subject to any disclaimer, the term of this patent is extended or adjusted under 35 U.S.C. 154(b) by 126 days.

(21) Appl. No.: 18/546,452

(22) PCT Filed: Feb. 18, 2022

(86) PCT No.: PCT/EP2022/054122
§ 371 (c)(1),
(2) Date: Aug. 15, 2023

(87) PCT Pub. No.: WO2022/175473
PCT Pub. Date: Aug. 25, 2022

(65) Prior Publication Data
US 2024/0178769 A1    May 30, 2024

(30) Foreign Application Priority Data
Feb. 18, 2021  (FR) ........................................ 2101611

(51) Int. Cl.
*H02P 1/54*       (2006.01)
*E06B 9/42*       (2006.01)
(Continued)

(52) U.S. Cl.
CPC ................. *H02P 5/56* (2016.02); *E06B 9/42* (2013.01); *E06B 9/72* (2013.01)

(58) Field of Classification Search
CPC ................. H02P 5/56; E06B 9/42; E06B 9/72
(Continued)

(56) References Cited

U.S. PATENT DOCUMENTS 10,895,105 B1   1/2021  Marchese
2010/0126543 A1 5/2010  Cutler
(Continued)

FOREIGN PATENT DOCUMENTS

WO    2008102141 A1   8/2008
WO    2015022324 A1   2/2015
WO    2019129782 A1   7/2019

OTHER PUBLICATIONS

International Search Report and Written Opinion dated May 24, 2022 in corresponding application No. PCT/EP2022/054122; w/ English machine translation (total 14 pages).

*Primary Examiner* — Erick D Glass
(74) *Attorney, Agent, or Firm* — SECKEL IP, PLLC

(57) ABSTRACT

The method for controlling a maneuvering device (2) to maneuver a screen (3) of an occulting home-automation system (1) between at least a first position and a second position comprises: a first actuator (5) equipped with a first electric motor (9), a torque detection device (19) and a position management module (27), a second actuator (6) equipped with a second electric motor (12), a torque detection device (26) and a position management module (28), and a winding shaft (7). The actuator and the second actuator are configured to drive the winding shaft. The method includes designating the first actuator as master actuator and the second actuator as slave actuator.

21 Claims, 4 Drawing Sheets

(51) Int. Cl.
  *E06B 9/72* (2006.01)
  *H02P 5/00* (2016.01)
  *H02P 5/56* (2016.01)
(58) Field of Classification Search
  USPC .......................................................... 318/41
  See application file for complete search history.

(56) References Cited

U.S. PATENT DOCUMENTS

| | | |
|---|---|---|
| 2012/0047977 A1 | 3/2012 | Smith et al. |
| 2013/0037068 A1 | 2/2013 | Cutler |
| 2015/0251235 A1 | 9/2015 | Smith et al. |
| 2019/0201955 A1 | 7/2019 | Smith et al. |
| 2020/0410827 A1 | 12/2020 | Lemaître et al. |
| 2021/0363822 A1* | 11/2021 | Blair ................. H02K 11/0094 |
| 2023/0019542 A1* | 1/2023 | Dupielet ................. E06B 9/322 |

* cited by examiner

METHOD FOR CONTROLLING AN OPERATING DEVICE COMPRISING A MASTER ACTUATOR AND A SLAVE ACTUATOR AND ASSOCIATED HOME AUTOMATION SHADING SYSTEM

TECHNICAL FIELD OF THE INVENTION

The invention relates to a method for controlling a manoeuvring device intended to manoeuvre a screen, notably to wind or unwind a screen. The invention relates also to a manoeuvring device and an occulting home-automation system comprising means for implementing such a method.

BACKGROUND ART

Doors or windows of a building are generally equipped with an occulting home-automation system for securing the building, and/or for controlling the thermal and phonic insulation or even for adjusting the brightness inside the building. These occulting home-automation systems can be automated using a manoeuvring device provided with an electric motor. In particular, manoeuvring devices are known that are composed of a winding tube around which a screen is intended to be wound. Such a manoeuvring device comprises an electric motor arranged inside the winding tube. The electric motor is supplied with energy via one or more converters.

Some applications require the use of an electric motor capable of supplying a high torque. The electric motor is then dimensioned accordingly. However, when using more powerful motors, energy losses occur in the converters used for their power supply and the efficiency of the manoeuvring devices decreases. In particular, the use of such motors can become incompatible with the use of autonomous energy sources. Furthermore, a more powerful motor also occupies more volume. The winding tube in which the motor is housed is therefore widened. The bulk of the manoeuvring device is therefore increased. Finally, the diversity of the possible applications for such manoeuvring devices also requires wide diversity of electric motors, which renders the management of a range of manoeuvring devices particularly complex.

SUMMARY OF THE INVENTION

The aim of the invention is to provide a manoeuvring device and a method for controlling such a manoeuvring device that remedy the above drawbacks and improve the manoeuvring devices and control methods known from the prior art.

More specifically, a first subject of the invention is a manoeuvring device and a method for controlling such a manoeuvring device that make it possible to optimize energy consumption.

A second subject of the invention is a manoeuvring device that is compact and economical to manufacture.

A control method according to the invention is defined by point 1 below.

1. Method for controlling a manoeuvring device intended to manoeuvre a screen of an occulting home-automation system between at least a first position and a second position, the manoeuvring device comprising:
   a first actuator equipped with a first electric motor, a torque detection device and a position management module,
   a second actuator equipped with a second electric motor, a torque detection device and a position management module and
   a winding shaft,
   the first actuator and the second actuator being configured to drive the winding shaft,
   the control method comprising a step of designation of the first actuator as master actuator and of the second actuator as slave actuator, and a step of configuration of the second actuator in which the operation of the position management module of the second actuator is at least partially disabled.

Various modes of execution of the method are defined by points 2 to 8 below.

2. Control method according to the preceding point, the control method comprising a step of feedback to a user by causing the generation, by the first actuator and/or by the second actuator, of a sound signal, preferentially in a situation in which at least one out of the first actuator and the second actuator is temporarily blocked in at least one direction of rotation.

3. Control method according to one of the preceding points, the control method comprising a step of regulation of the speed of rotation of a rotor of the first electric motor as a function of a speed setpoint, and a step of adaptation of the operation of the second electric motor as a function of a value representative of a torque supplied by the first electric motor.

4. Control method according to the preceding point, characterized in that the step of adaptation of the operation of the second electric motor comprises:
   a first substep of determination of a first value representative of the torque supplied by the first electric motor and of a second value representative of a torque supplied by the second electric motor, then
   a second substep of comparison of the second value with the first value, then
   if the second value is strictly less than a predefined percentage of said first value, a third substep of increasing of a speed setpoint of the second electric motor, and
   if the second value is strictly greater than the predefined percentage of said first value, a fourth substep of reduction of a speed setpoint of the second electric motor.

5. Control method according to the preceding point, characterized in that the second motor is a direct current motor, in that said third substep comprises an increase of a control duty cycle of the second electric motor, and in that said fourth substep comprises a reduction of a control duty cycle of the second electric motor.

6. Control method according to one of points 4 and 5, characterized in that said first value is equal to the power supply current of the first electric motor and/or said second value is equal to the power supply current of the second electric motor and/or in that the predefined percentage is a percentage lying between 80 and 120%, preferentially 100%.

7. Control method according to one of the preceding points, characterized in that it comprises a phase of starting-up of the manoeuvring device comprising:
   a simultaneous startup of the first electric motor and of the second electric motor, and/or
   a startup of the first electric motor at a power supply voltage predetermined as a function of the speed setpoint but without this voltage allowing a movement of the rotor of the first electric motor, then a powering of the second electric motor driving the winding shaft in rotation.

8. Control method according to one of the preceding points, characterized in that it comprises a phase of stopping of the manoeuvring device comprising:
   a simultaneous stopping of the first electric motor and of the second electric motor by transmission of a stop command from the master actuator to the slave actuator, and/or
   a stopping of either one of the first electric motor or the second electric motor, the other electric motor being stopped upon the detection of an excessive torque.

A manoeuvring device according to the invention is defined by point 9 below.

9. Manoeuvring device intended to manoeuvre a screen of an occulting home-automation system between at least a first position and a second position, the manoeuvring device comprising:
   a first actuator equipped with a first electric motor, a torque detection device and a position management module,
   a second actuator equipped with a second electric motor, a torque detection device and a position management module and
   a winding shaft,
   the first actuator and the second actuator being configured to drive the winding shaft,
   the first actuator being designated as master actuator and the second actuator as slave actuator, the manoeuvring device comprising a memory provided with information relating to the at least partial disabling of the position management module of the second actuator.

Different embodiments of the manoeuvring device are defined by points 10 to 12 below.

10. Manoeuvring device according to the preceding point, comprising:
    a means for regulating the speed of rotation of a rotor of the first electric motor as a function of a speed setpoint and
    a means for adapting the operation of the second electric motor as a function of a value representative of a torque supplied by the first electric motor, notably as a function of a power supply current of the first electric motor.

11. Manoeuvring device according to one of points 9 and 10, characterized in that the first electric motor and/or the second electric motor is a brushless direct current synchronous motor.

12. Manoeuvring device according to one of points 9 to 11, characterized in that the first electric motor and the second electric motor comprise a same technical definition, and/or in that the winding shaft is a winding tube, the first electric motor and the second electric motor being incorporated inside the winding tube, notably the first electric motor and the second electric motor being arranged symmetrically with respect to one another inside the winding tube.

A home-automation system according to the invention is defined by point 13 below.

13. Occulting home-automation system, characterized in that it comprises a manoeuvring device according to one of points 9 to 12, a screen configured to be wound around the winding shaft, and at least one converter for supplying energy to the first electric motor and/or the second electric motor.

A program product according to the invention is defined by point 14 below.

14. Computer program product comprising program code instructions stored on a computer-readable medium to implement the steps of the control method according to any one of points 1 to 8 when said program runs on a computer.

A data storage medium according to the invention is defined by point 15 below.

15. Computer-readable data storage medium, on which is stored a computer program comprising program code instructions for implementing the control method according to one of points 1 to 8.

Finally, the invention relates also to a signal from a data medium, conveying the computer program product as defined previously.

BRIEF DESCRIPTION OF THE DRAWINGS

These subjects, features and advantages of the present invention will be explained in detail in the following description of a particular embodiment given as a nonlimiting example in relation to the attached figures in which.

DETAILED DESCRIPTION OF PARTICULAR EMBODIMENTS

Figure 1:
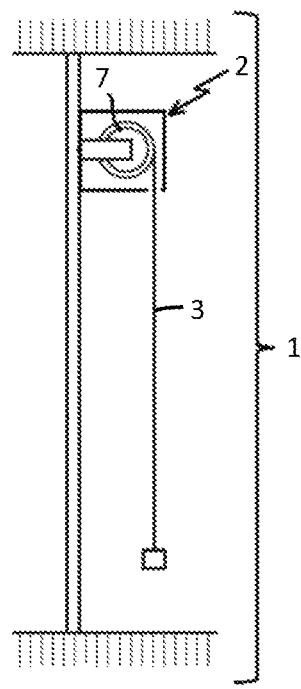
FIG. 1 is a cross-sectional view of an embodiment of an occulting home-automation system comprising a manoeuvring device according to an embodiment of the invention.
Figure 2:
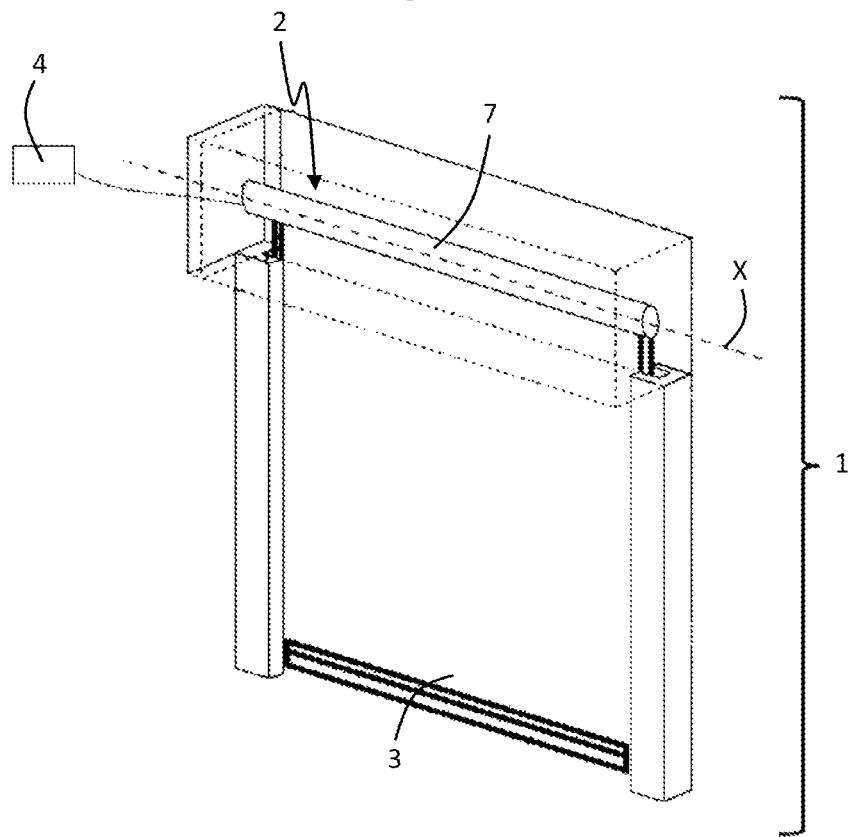
FIG. 2 is a perspective view of an embodiment of the occulting home-automation system.

FIGS. 1 and 2 schematically illustrate an occulting home-automation system 1 according to an embodiment of the invention. The occulting home-automation system 1 is a home-automation installation comprising a manoeuvring device 2, a screen 3 and a means for supplying energy 4 to the manoeuvring device 2. The occulting home-automation system can be installed in any building such as a house, an apartment or any real estate. The screen 3 can be intended to occult a window, a door, or any type of opening. It can also be intended to cover or conceal any surface, such as, for example, the surface of a terrace or of a pergola.

The manoeuvring device 2 is intended to displace the screen between at least a first position and a second position. The screen 3 can for example be a folded or louvred blind, a curtain, a windable fabric, a shutter or any other type of flexible or articulated screen, and more generally any type of occulting means. The screen can for example be formed by a set of articulated slats. Hereinafter in the document, the term "screen" is used to designate equally the various embodiments of the screen 3.

The manoeuvring device 2 can be able to supply a relatively high torque, so as to displace a heavy or large screen. The occulting home-automation system 1 can also comprise a spring mechanism configured with a driving direction for driving the deployment and/or the folding-up of the screen. Such a spring mechanism is used for example to manoeuvre the arms of a terrace blind, to deploy the latter. The torque supplied by the manoeuvring device can then be useful to slow down the action of the springs when the latter work in their direction of driving of the screen and/or to tighten the springs of the mechanism when the screen is manoeuvred against the direction of driving of the spring mechanism. The manoeuvring device 2 can also be a particularly compact device, notably intended for installation inside a building.

The movement controlled by the manoeuvring device can be of various natures, depending on the type of screen. For example, the controlled movement can be a winding movement around a shaft, notably a tube. In this case, the speed of the movement of the screen is set by the speed of rotation of the tube. The movement controlled by the manoeuvring device can also be a movement of rotation of louvres of a louvred blind, or a translational movement, for example a movement driving a flexible link driving a screen, such as a curtain, in translation, fixed to the flexible link.

Figure 3:
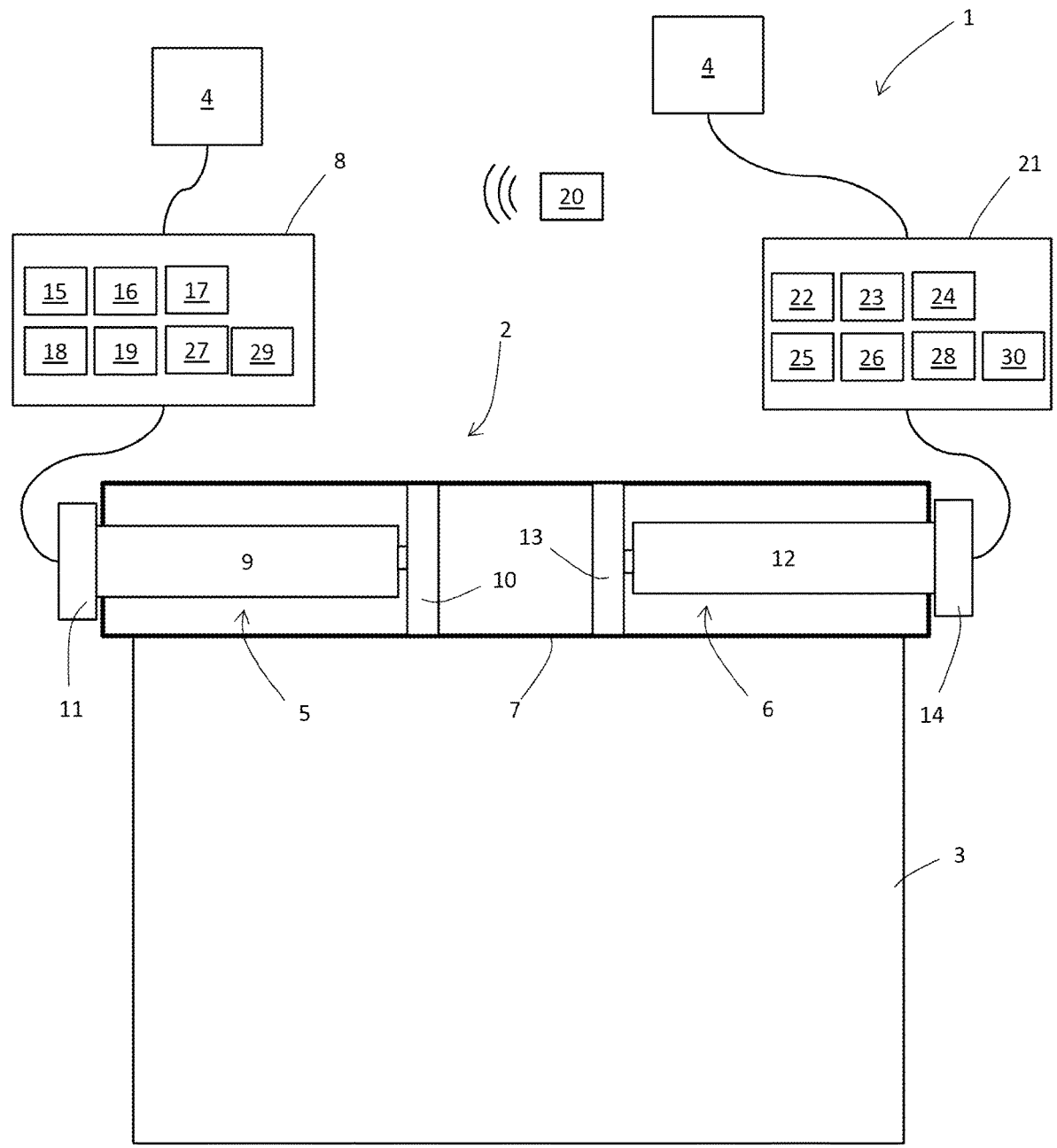
FIG. 3 is a schematic view of the manoeuvring device according to a first embodiment of the invention.

In relation to FIG. 3, the manoeuvring device comprises a first actuator 5, a second actuator 6, a winding shaft 7, notably a winding tube 7.

The first actuator 5 comprises a first electric motor 9 and an output shaft on which can be mounted a first drive wheel 10. The electric motor 9 and the drive wheel 10 are both housed inside the winding tube 7. The first drive wheel 10 is fixed to the winding tube 7 and is secured to a rotor of the first electric motor 9 via a first reducing gear. The first electric motor 9 further comprises a stator secured to a first connection interface 11 arranged at a first end of the winding tube 7. The first actuator 5 further comprises a first control means 8 of the first electric motor 9.

Similarly, the second actuator 6 comprises a second electric motor 12 and an output shaft on which can be mounted a second drive wheel 13. The electric motor 12 and the drive wheel 13 are both housed inside the winding tube 7. The second drive wheel 13 is fixed to the winding tube 7 and is also secured to a rotor of the second electric motor 12 via a second reducing gear. Consequently, the two drive wheels 10 and 13 are coupled to one another via the winding tube 7. The winding shaft is rigid and therefore rigidly links an output shaft of the first actuator 5 to an output shaft of the second actuator 6. The second electric motor 12 also comprises a stator secured to a second connection interface 14 arranged at a second end of the winding tube 7, opposite the first end of the winding tube 7. The second actuator 6 further comprises a second control means 21 of the second electric motor 12.

The first actuator 5 and the second actuator 6 are therefore configured to drive the winding tube 7 in rotation. The first electric motor 9 and the second electric motor 12 are arranged symmetrically with respect to one another, inside the winding tube 7. Thus, in steady-state operation, their respective rotors rotate substantially at the same speed but in opposite directions.

Advantageously, the first actuator 5 and the second actuator 6 are identical. However, the first electric actuator 5 and the second electric actuator 6 are indeed two actuators that are distinct from one another. More generally, the first electric motor 9 and the second electric motor 12 can comprise a same technical definition, that is to say an identical design, or even a same characteristic of speed of rotation as a function of the torque supplied by the motor, called torque/speed characteristic. The first electric motor 9 and/or the second electric motor 12 can preferably be a direct current brushless synchronous motor. Such a motor is commonly called a BLDC (brushless direct current) motor or even motor with electronic switching.

As a variant, the invention could also be transposed to a manoeuvring device in which one of the two electric motors, even both of the electric motors, is or are of a different type, notably a synchronous motor, with brushes, and with direct current, or even a two-phase asynchronous motor, or even a three-phase asynchronous motor. The two actuators 5 and 6 could also have different torque/speed characteristics.

The winding tube extends overall along an axis X. It comprises an internal volume intended to house the actuators 5 and 6. The internal diameter of the winding tube 7 is substantially greater than the outer diameter of the actuators 5 and 6, such that they can be inserted into the winding tube 7, when the manoeuvring device is being assembled. The winding tube 7 can have a length along the axis X that corresponds substantially to the width of the screen 3.

Advantageously, the winding tube extends horizontally. It can for example be positioned at a top edge of a window, of a door, or of any other type of opening. In the unwound configuration, the screen can extend vertically, for example facing the glazed surface of a window. As a variant, the screen could extend obliquely, for example to occult a roof window, or shade a terrace, even horizontally, as on a pergola for example.

The energy supply means 4 of the manoeuvring device comprises at least one converter capable of supplying an electric current intended to power at least one of the electric motors 9 and 12. Such a converter can for example be of the AC/DC or DC/DC or DC/AC type. It will notably be defined according to the nature of an energy source upstream of the converter and as a function of the technical characteristics of the electric motor or motors to be powered. The energy source can be taken from an energy distribution network. The energy supply means can alternatively be linked to or comprise a local energy source. This local energy source can for example be a set of electrochemical cells, a mains-rechargeable battery, or even a battery that can be recharged by photovoltaic panel.

According to a first embodiment represented in FIG. 3, the occulting home-automation system can comprise an energy supply means 4 for each of the electric motors 9 and 12. The two electric motors can thus be powered via an electricity distribution network (in other words by the mains). As a variant, one can be powered by the electricity distribution network, the other by a local energy source. As a variant, the two motors can also each be powered by a local energy source. A distinct power supply for each of the two electric motors simplifies the installation, because there is possibly access to an electrical line on one of the sides of the home-automation system, while it is less common to have this energy source on both of its sides, which requires power supply cables to be pulled along the manoeuvring device 2.

The control means 8, 21 are electronic control units specific to each actuator 5, 6. Each control means 8, 21 comprises:
 a communication interface 15, 22,
 a memory 16, 23,
 a microprocessor 17, 24,
 power supply means 18, 25, respectively for the electric motor 9 and 12,
 a torque detection device 19, 26, for example comprising means for determining the electrical current consumed by the electric motor 9 or, respectively, the electric motor 12,
 a position management module 27, 28 comprising current position detection means, based for example on the recording of the angular positions of the rotor of the electric motor 9 or 12 in the travel of the screen, and finally a regulation means 29, 30, respectively for regulating the speed of rotation of the rotor of the first electric motor 9 and of the second electric motor 12, as a function of a speed setpoint.

The control means 8, 21 can be housed respectively in the first actuator 5 and the second actuator 6, for example at the connection interfaces 11 and 14 respectively. Alternatively, the communication interfaces 15, 22 can be any distinct housing, while the memory 16, 23, the microprocessors 17, 24, the power supply means 18, 25, the detection means 19, 26, the position management modules 27, 28, and the regulation means 29, 30 are housed in each of the actuators 5 and 6.

The communication interfaces 15, 22 can be wireless communication interfaces, for example radio wave communication interfaces, or wired communication interfaces. The communication interface 15 is configured to receive control commands from a control unit 20, such as a remote control. The communication interface 15 can transmit control commands which are received by the communication interface 22.

The control means 8, 21 are able to respectively regulate the speed of rotation of the rotor of the electric motors 9 or 12, for example via the power supply means 18, 25. Advantageously, these speeds of rotation are controlled by a pulse-width modulation, commonly referred to by the acronym PWM. Pulse-width modulation is based on the control of a duty cycle to vary the average voltage with which the electric motor is powered. The duty cycle is defined by the ratio between the duration of an active state of the voltage over a given period. The greater the duty cycle, the greater the average power supply voltage and the faster the rotation of the electric motor. As a variant, the power supply voltage of the electric motors 9 and 12 could be an adjustable voltage and the speed of rotation could then be controlled by adjusting the value of the power supply voltage with constant torque.

The memories 16, 23 of the control means 8, 21 are a data storage medium on which is stored a computer program comprising program code instructions for implementing a method for controlling the manoeuvring device according to an embodiment of the invention. The microprocessors 17, 24 are capable of running this computer program.

Figure 4:
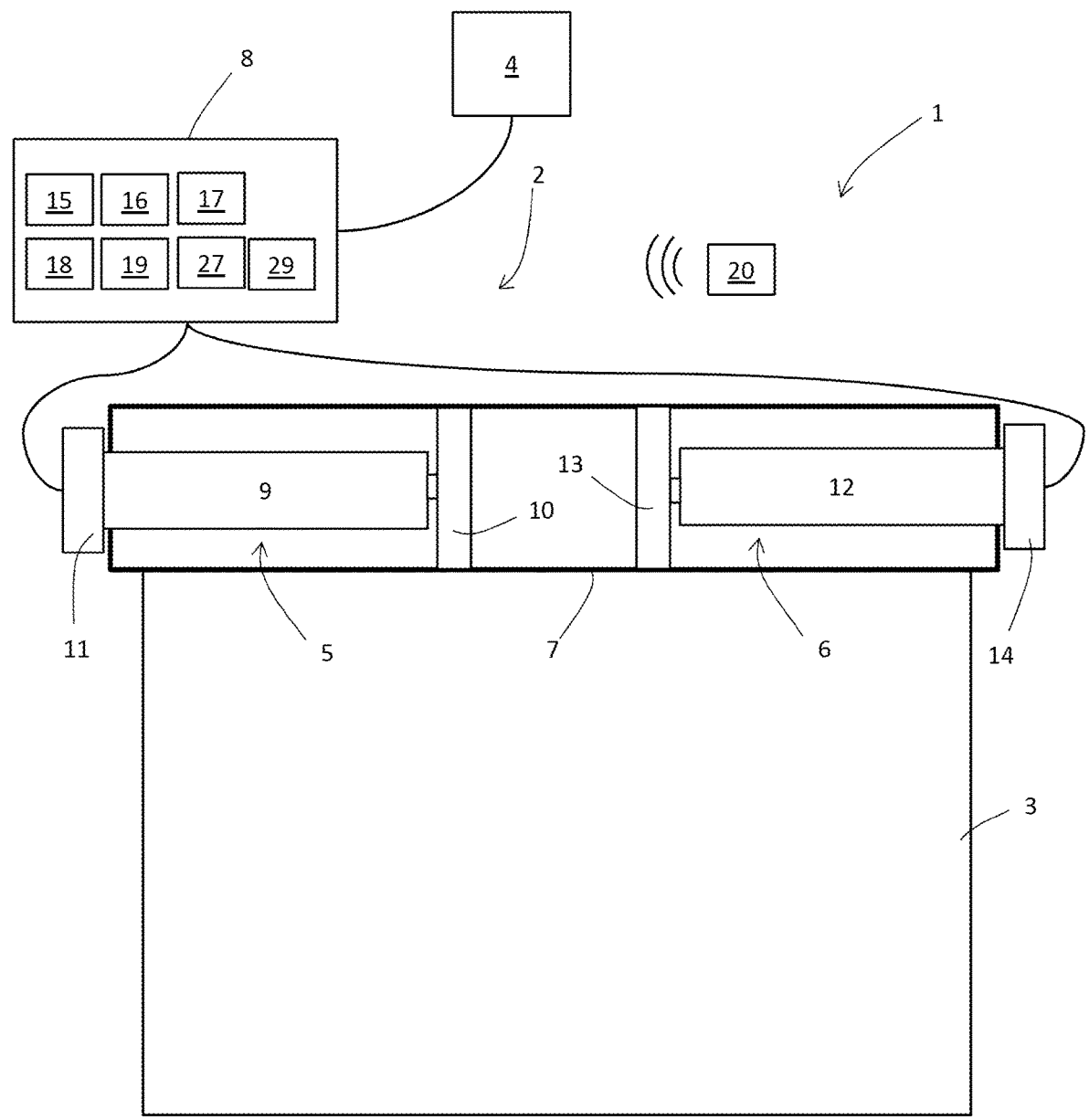
FIG. 4 is a schematic view of the manoeuvring device according to a second embodiment of the invention.

According to a second embodiment, illustrated in FIG. 4, the manoeuvring device could comprise a single energy supply means 4 linked with a single control means 8, itself linked with the two actuators 5, 6. According to the second embodiment, the communication interface 15, the memory 16, the microprocessor 17, the power supply means 18 can be incorporated in one and the same housing, mounted inside or outside the winding tube 7.

According to a third embodiment (not represented), the elements of the control means 8, 21 could be distributed and be incorporated in distinct housings linked by wire or wirelessly to one another, notably by radio link. For example, the communication interface 15, the memory 16, the microprocessor 17, the power supply means 18 of the first electric motor and the torque detection device 19 and the position management module 27 associated with the first electric motor can be incorporated in the first actuator. The communication interface 22, the memory 23, the microprocessor 24, the power supply means 25 of the second electric motor and the torque detection device 26 and the position management module associated with the second electric motor can be incorporated in the second actuator.

Figure 5:
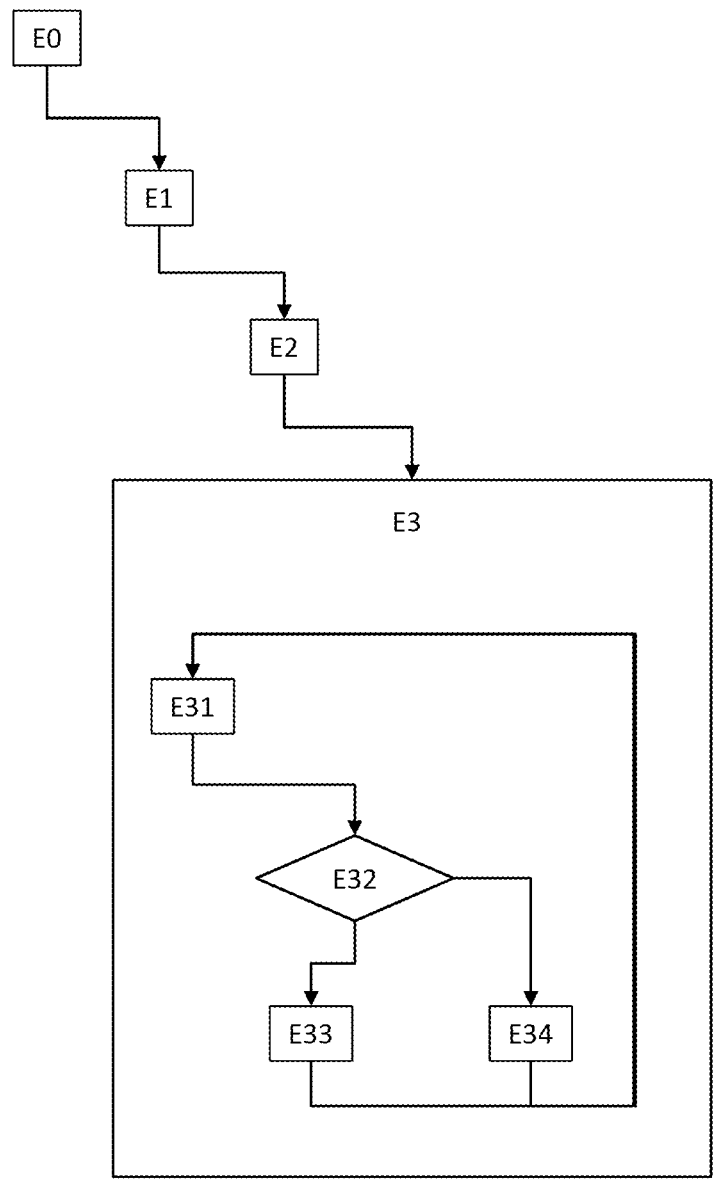
FIG. 5 is an overview diagram of a method for controlling a manoeuvring device according to an embodiment of the invention.

An embodiment of the method for controlling the manoeuvring device 2 is now described according to an embodiment of the invention in relation to FIG. 5.

In a preliminary step E0, an installer designates, from among the actuator 5 and the actuator 6, which of the two is the master actuator and which is the slave actuator. If the two actuators are identical, this designation can be chosen by the installer. If the actuators are not identical, their differences may urge the installer to choose one of them rather than the other to act as master actuator. This designation can be made at the time of incorporation of the control unit 20 in the installation and the pairing of the actuators 5 and 6 with the control unit 20. This pairing consists notably in the exchange of at least one identifier between an actuator and the control unit, this shared identifier allowing a secure communication between the control unit and the actuator. In this step E0, the installer can use the input keyboard of the control unit to communicate to each actuator its master or slave status. This status is stored in the memories 16 and 23. This status can make it possible to activate software subprograms of the control means 8, 21 suited to the operation of the actuator as master or as slave.

As a variant, the designation of an actuator as master or slave actuator in the preliminary step E0 could also be made automatically or semi-automatically, for example via a double mains outage, via the activation of a programming button on the actuators, or even via a remote control previously paired with one of the actuators. It is thus possible to have one of the actuators start up in a programming mode, in which it awaits information to be stored. Next, this actuator observes a significant torque: it is blocked in rotation because the other actuator is not powered. It is then designated automatically as master and sends a programming frame to the second actuator for a predetermined time. When the second actuator is in turn powered, it receives the programming frame and is defined as slave actuator.

In the example below, the first actuator 5 is selected and designated as master actuator and the second actuator 6 is selected and designated as slave actuator. The master actuator 5 is capable of transmitting control commands intended for the slave actuator 6. The slave actuator is capable of receiving the control commands from the master actuator and of executing them. Notably, the control means 8 of the master actuator 5 can set, for the slave actuator 6 through corresponding control commands:

its direction of rotation; a command to rotate in reverse direction is then transmitted for the attention of the slave actuator; and/or the reference speed for the regulation; and/or motor stoppage in case of end-of-travel or detection of over-torque and the sending of a stop command to the slave actuator; and/or the application position management (for example the tracking of position and reaching of a specific position, such as an end-of-travel position or a predefined intermediate stop position).

In a configuration step E1, the actuator 6, designated as slave actuator, is configured such that the operation of its position management module 28 is at least partially disabled. In other words, the control means 21 of the actuator 6 stores information relating to the at least partial disabling of its position management module 28. For example, this configuration of the slave actuator 6 determines that it can no longer manage any specific stop position through the position tracking of the current position.

According to a variant, this configuration of the slave actuator 6 renders the search for extreme end-of-travel positions, normally necessary to terminate the slave actuator 6 configuration procedure, unnecessary. This configuration makes it possible to avoid a conflict between the operation of the position management module of the master first actuator 5 and of the slave second actuator 6, notably if the prestored positions differ. In other words, only the position management module 27 of the master actuator 5 manages the stops in prestored positions at the end of the step E1.

In a second step E2, a user interacts, in a substep E21, with the control unit 20 to define a command of the occulting home-automation system. Such a command can be, for example, a command to wind up the screen, a command to wind down the screen, or even a command to reach a particular screen position. A control command is then received by the control means 8 via its communication interface 15. This control command can then be translated in the form of a rotation speed setpoint of the winding tube.

In a second substep E22, for the master actuator, the speed of rotation of the rotor of the first electric motor 9 is powered and regulated, for example via the power supply means 18. For this, the pulse width of the control voltage of the first electric motor 9 is modulated (that is to say the duty cycle of the first electric motor 9 is regulated) so as to obtain a speed of rotation of the rotor of the first electric motor that corresponds to the setpoint received in the first step. The winding tube 7 is then driven in rotation according to a regulated rotation speed. Simultaneously, the second electric motor 12 is also powered, in a direction that is the reverse of the first electric motor 9.

According to a first embodiment, the slave actuator 6 also uses its own control means 21 and self-regulates its speed. The torques supplied by the two actuators will then have a tendency to balance automatically about their natural operating value because the two actuators will rotate at the same speed. The torque value of each actuator can be different.

According to another embodiment, and in a third step E3 performed by the slave actuator 6, the operation of the second electric motor is adapted according to a power supply current of the first electric motor. The third step can comprise a set of substeps E31, E32, E33, E34 repeated iteratively according to a given frequency.

More particularly, the third step E3 comprises a first substep E31 in which the slave actuator 6 receives the power supply current information from the first electric motor and monitors the power supply current of the second electric motor. This first substep is notably executed in support of the torque detection devices, for example of the means for determining the electric current consumed by each of the electric motors 9 and 12.

In other cases, the slave actuator 6 receives voltage information from the first electric motor and monitors a voltage associated with the second electric motor. This first substep is notably executed in support of the torque detection devices, for example of the means for determining the voltage of a phase-shifting capacitor between the stator windings of each of the electric motors 9 and 12, if the latter are asynchronous motors.

Generally, the slave actuator 6 receives a value representative of the torque associated with the first electric motor and monitors a value representative of the torque associated with the second electric motor. The value representative of the torque associated with the first electric motor can be transmitted by the first actuator 5 and received by the second actuator 6 by using their communication interfaces 15, 22.

Next, the third step E3 comprises a second substep E32 in which a first value representative of the torque supplied by the first electric motor is compared to a second value representative of a torque supplied by the second electric motor. In particular, the first value can be simply equal to the power supply current of the first electric motor and the second value can be simply equal to the power supply current of the second electric motor. A direct comparison of the two power supply currents is notably relevant if the two electric motors have the same technical definition. More generally, the first value corresponds to a value representative of the torque associated with the first electric motor 9 and the second value corresponds to a value representative of the torque associated with the second electric motor 12.

In as much as the actuators or their electric motors can differ, it is possible to compare the second value to a predefined percentage of the first value, for example to a percentage between 80 and 120% of the first value. Thus, it would also be possible to compare the power supply current of the second electric motor to a percentage of the power supply current of the first electric motor. Such a comparison would make it possible to obtain different torques for each of the two electric motors. Such a mode of operation may be of interest if the two electric motors have different technical definitions, notably if they operate with different power supply currents, or even if there is a deliberate desire to preserve one of the two electric motors to the detriment of the other, for example in the case where one of the actuators is mains-powered while the other is powered by batteries.

Next, if the second value is strictly less than the predefined percentage of the first value, there is a third substep E33 of increasing of a speed setpoint of the second electric motor. This is, for example, a substep in which the control duty cycle of the second electric motor 12 is increased. If the second value is strictly greater than the predefined percentage of the first value, there is a fourth substep E34 of reduction of a speed setpoint of the second electric motor. This is, for example, a substep in which the control duty cycle of the second electric motor is reduced. The reducing or the increasing of the control speed setpoint of the second electric motor can be done according to a predetermined step on each iteration of the substeps E33 or E34. As a variant, the reducing or the increasing of this speed setpoint could also be calculated as a function of a value equal to the difference between the power supply current of the second electric motor and said first value.

Given the symmetrical arrangement of the two electric motors 9 and 12, the second electric motor 12 is controlled in such a way that its rotor rotates in the reverse direction of the rotor of the first electric motor 9.

By proceeding in this way, in particular for direct current motors, a regulation of the duty cycle of the second motor is obtained that is a function of the power supply currents of the two electric motors 9 and 12. The power supply current of the second electric motor thus becomes substantially equal to the first value. Generally, whatever the type of actuator used, the aim is to obtain a chosen distribution of the working torques for each actuator. The working torque supplied by each actuator is advantageously close, or even equal, to the nominal torque that the actuator can supply. Thus, a situation is avoided in which one of the two actuators operates with a torque that is too great with respect to its capabilities. The operation of the manoeuvring device is thus optimized. The working torques supplied by each of the actuators add up to effectively manoeuvre the screen 3.

The control method as described previously comprises a transient start-up phase, in which the rotors of the two electric motors are set to rotate. In this start-up phase, there can be a simultaneous or quasi-simultaneous start-up of the first electric motor and of the second electric motor. In this case, an initial control command is transmitted to each of the two electric motors for the latter to be powered. Next, the operation of the second electric motor is adapted according to the power supply current of the first electric motor in accordance with the third step E3 described previously.

As a variant, in this start-up phase, the first electric motor can be controlled by a power supply voltage determined as a function of the speed setpoint, but without this voltage allowing a movement of the rotor. During the first iteration or iterations of the adaptation step E3, the power supply current of the first and the second electric motors is progressively increased until the winding tube is driven in rotation and reaches the regulation speed. One of the actuators may therefore temporarily operate with a slightly greater working torque. That would not be damaging to the other actuator in as much as the start-up phase is only transient.

The control method can also comprise a phase of stopping of the manoeuvring device. In this stopping phase, there can be a simultaneous or quasi-simultaneous stoppage of the first electric motor and of the second electric motor. The communication interface 15 allows the transmission of this stop command from the master actuator to the slave actuator. As a variant, it is possible to proceed to stop either one of the first electric motor and the second electric motor, the other electric motor being stopped automatically following the detection of an excessive working torque, because of the blocking of the rotation of the winding tube by the electric motor that is stopped.

The control method which has just been described relates to a method in which the speed of rotation of the winding tube is regulated according to a given speed setpoint. Such a method therefore makes it possible to wind or unwind the screen around the winding tube according to a given speed profile, notably with a constant speed. The same manoeuvring device could also be used without speed regulation. In this case, the working torques of each of the actuators tend to balance automatically about their natural operating value because the rotors of the two electric motors rotate at the same speed.

Other embodiments of the manoeuvring device according to the invention can be proposed. For example. the manoeuvring device can comprise a greater number of electric motors, for example three or four electric motors in a screen support rail, for example to drive a winding shaft on which cords or straps holding the screen are wound. In this case, the method which has just been described can be adapted so as to adapt the operation of the additional slave electric motors in the manner described for the slave actuator 6. The arrangement of the electric motors within a winding tube could be different; for example they could be oriented in the same direction. According to another variant, the electric motors could be arranged on the outside of the winding tube.

By virtue of the invention, a manoeuvring device is obtained which is both powerful and compact. Each of the actuators of the manoeuvring device produces a moderate working torque and therefore requires a power supply current that is much lower than a single actuator producing an equivalent working torque. The energy losses within the converters used for the powering of the actuators are minimized. Furthermore, it is possible, by virtue of the invention, to widen a range of manoeuvring devices without designing new electric motors. There is therefore also a saving on the resources that are useful to the development of new products.

Whatever the embodiment, preferably, in the method, it is possible, at least in certain situations or configurations of the manoeuvring device 2, to provide feedback to the user or the installer by having a sound signal generated by the first actuator 5 and/or on the second actuator 6. This solution can notably be implemented in the situations in which:

the winding shaft 7 is blocked in an end-of-travel position, and/or the first actuator and/or the second actuator are not (yet) configured to act synchronously, notably to act in the same direction to drive the winding shaft.

Thus, more generally, sound feedback is implemented preferentially in a situation in which at least one out of the first actuator 5 and the second actuator 6 is temporarily blocked in at least one direction of rotation.

The generation of the sound signal is obtained by applying a particular electrical signal or particular electrical signals to power the first and/or the second actuator. Notably, the particular electrical signal has a frequency that makes it possible to make the actuator vibrate, preferably without setting its output shaft in motion, even in the absence of any load retaining it. Advantageously, to implement this electrical signal generation, the motor or motors of the actuators are of the BLDC type mentioned previously.

Examples of power supplies of electric motors that make it possible to produce sound signals are described in the application WO2019/129782A1, in particular in the passage from line 12 of page 17 to line 26 of page 31 disclosed with reference to FIGS. 5 to 8.

For example, this sound signal generation solution can be used in a phase of configuration of the manoeuvring device in which the first and second actuators linked to the same winding shaft are configured to be paired to a command transmitter. It is thus possible, in a first step, to pair the first actuator to the transmitter and configure it as a master actuator. Following this first step, the first actuator can, as a consequence of a particular electrical power supply, transmit a feedback sound signal to indicate to the user (or to the installer) that the first actuator has indeed been configured, or not. Likewise, it is possible, in a second step, to configure the second actuator as being a slave actuator (and possibly pair it to the transmitter). Following this second step, the second actuator can, as a consequence of a particular electrical power supply, transmit a feedback sound signal to indicate to the user that the second actuator has indeed been configured, or not.

Moreover, after these configurations, the first and second actuators can act coherently on the winding shaft in such a way that feedback to the user can thereafter be produced by displacements of the screen that are visible to the user.

The invention claimed is:

1. A method for controlling a maneuvering device intended to maneuver a screen of an occulting home-automation system between at least a first position and a second position, the maneuvering device comprising:

a first actuator equipped with a first electric motor, a torque detection device and a position management module, a second actuator equipped with a second electric motor, a torque detection device and a position management module, and a winding shaft, wherein each of the first actuator and the second actuator is directly connected to the winding shaft, wherein the first actuator and the second actuator are configured to drive the winding shaft, and wherein the method comprises designating the first actuator as master actuator and the second actuator as slave actuator, and configuring the second actuator wherein operation of the position management module of the second actuator is at least partially disabled.

2. The method according to claim 1, comprising providing feedback to a user by causing generation, by the first actuator and/or by the second actuator, of a sound signal.

3. The method according to claim 1, comprising:

regulating a speed of rotation of a rotor of the first electric motor as a function of a speed setpoint, and adapting operation of the second electric motor as a function of a value representative of a torque supplied by the first electric motor.

4. The method according to claim 3, wherein the adapting of the operation of the second electric motor comprises:

determining a first value representative of the torque supplied by the first electric motor and a second value representative of a torque supplied by the second electric motor, then comparing the second value to the first value, then if the second value is strictly less than a predefined percentage of the first value, increasing a speed setpoint of the second electric motor, and if the second value is strictly greater than the predefined percentage of said first value, reducing a speed setpoint of the second electric motor.

5. The method according to claim 4, wherein the second motor is a direct current motor, the increasing of the speed setpoint of the second electric motor comprises increasing a control duty cycle of the second electric motor, and the reducing of the speed setpoint of the second electric motor comprises reducing the control duty cycle of the second electric motor.

6. The method according to claim 4, wherein the first value is equal to the power supply current of the first electric motor, and/or the second value is equal to the power supply current of the second electric motor, and/or the predefined percentage is in a range of from 80 to 120%.

7. The method according to claim 1, comprising a phase of starting up the maneuvering device comprising:

simultaneously starting up the first electric motor and the second electric motor, and/or starting up the first electric motor at a power supply voltage predetermined as a function of a speed setpoint but without a voltage allowing a movement of the rotor of the first electric motor, then powering the second electric motor driving the winding shaft in rotation.

8. The method according to claim 1, comprising a phase of stopping of the maneuvering device comprising:

simultaneously stopping the first electric motor and of the second electric motor by transmission of a stop command from the master actuator to the slave actuator, and/or stopping either one of the first electric motor or the second electric motor, the other electric motor being stopped upon the detection of an excessive torque.

9. A maneuvering device intended to maneuver a screen of an occulting home-automation system between at least a first position and a second position, the maneuvering device comprising:

a first actuator equipped with a first electric motor, a torque detection device and a position management module, a second actuator equipped with a second electric motor, a torque detection device and a position management module, and a winding shaft, wherein each of the first actuator and the second actuator is directly connected to the winding shaft, wherein the first actuator and the second actuator are configured to drive the winding shaft, and wherein the first actuator is designated as master actuator and the second actuator is designated as slave actuator, the maneuvering device comprising a memory provided with information relating to at least partial disabling the position management module of the second actuator.

10. The maneuvering device according to claim 9, comprising:

means for regulating the speed of rotation of a rotor of the first electric motor as a function of a speed setpoint, and means for adapting the operation of the second electric motor as a function of a value representative of a torque supplied by the first electric motor.

11. The maneuvering device according to claim 9, wherein the first electric motor is a brushless direct current synchronous motor, and/or the second electric motor is a brushless direct current synchronous motor.

12. The maneuvering device according to claim 9, wherein the first electric motor and the second electric motor comprise a same technical definition, and/or the winding shaft is a winding tube, the first electric motor and the second electric motor being incorporated inside the winding tube.

13. An occulting home-automation system comprising:

a maneuvering device according to claim 9, a screen configured to be wound around the winding shaft, and at least one converter for supplying energy to the first electric motor and/or the second electric motor.

14. A non-transitory computer-readable storage medium having embodied thereon a computer program product comprising program code instructions to implement, when the program runs on a computer, a method for controlling a maneuvering device intended to maneuver a screen of an occulting home-automation system between at least a first position and a second position, the maneuvering device comprising:

a first actuator equipped with a first electric motor, a torque detection device and a position management module, a second actuator equipped with a second electric motor, a torque detection device and a position management module, and a winding shaft, wherein each of the first actuator and the second actuator is directly connected to the winding shaft, wherein the first actuator and the second actuator are configured to drive the winding shaft, and wherein the method comprises designating the first actuator as master actuator and the second actuator as slave actuator, and configuring the second actuator wherein operation of the position management module of the second actuator is at least partially disabled.

15. A computer comprising the non-transitory computer-readable data storage medium according to claim 14.

16. A system comprising the computer of claim 15 and a maneuvering device intended to maneuver a screen of an occulting home-automation system between at least a first and a second position, wherein the maneuvering device is controlled by the method.

17. The method according to claim 2, comprising providing feedback to a user by causing generation, by the first actuator and/or by the second actuator, of a sound signal in a situation in which the first actuator and/or the second actuator is temporarily blocked in at least one direction of rotation.

18. The method according to claim 4, wherein the predefined percentage is 100%.

19. The maneuvering device according to claim 10, wherein the operation of the second electric motor is adapted as a function of a power supply current of the first electric motor.

20. The maneuvering device according to claim 9, wherein the winding shaft is a winding tube, the first electric motor and the second electric motor being incorporated inside the winding tube, the first electric motor and the second electric motor being arranged symmetrically with respect to one another inside the winding tube.

21. The method according to claim 1, wherein each of the first actuator and the second actuator has an output shaft rigidly linked to the winding shaft.

* * * * *